(No Model.)
R. KLOSS.
COLTER.
No. 296,335. Patented Apr. 8, 1884.
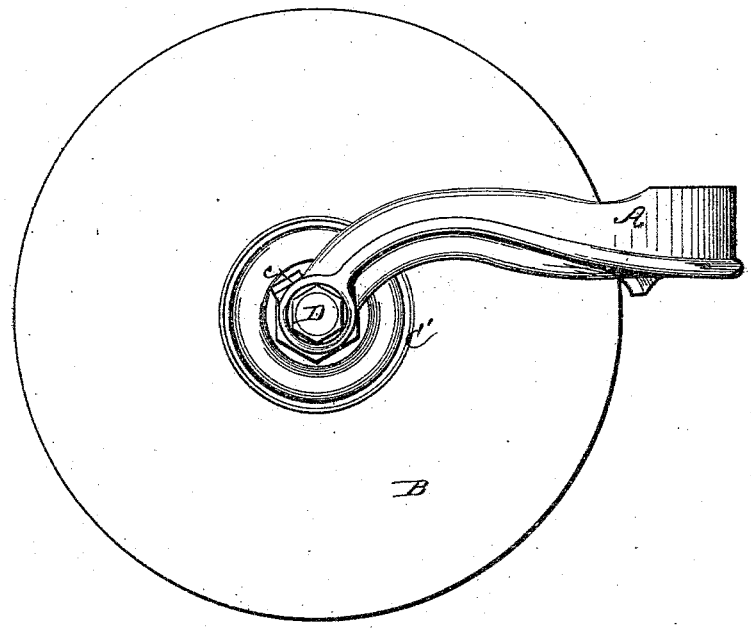
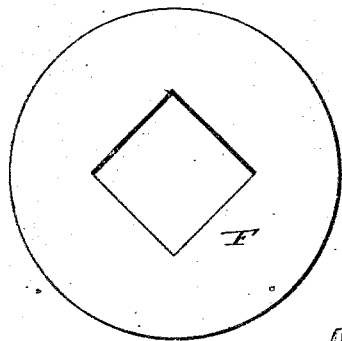
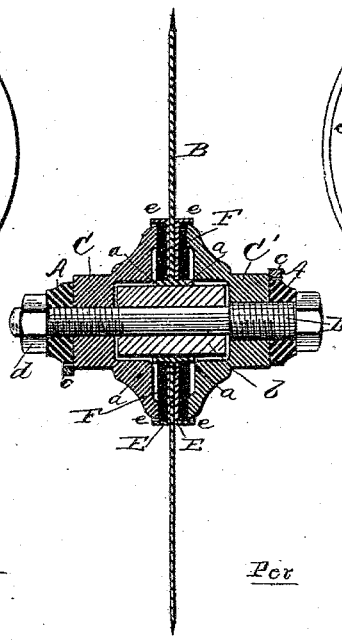
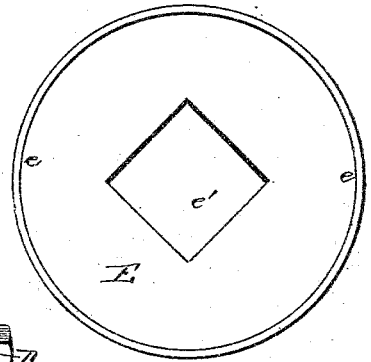
Witnesses:
C. L. Carman,
H. C. McArthur,
Inventor.
Robert Kloss
Per
H. Hanson
Attorney.

UNITED STATES PATENT OFFICE.

ROBERT KLOSS, OF SHABONIER, ILLINOIS.

COLTER.

SPECIFICATION forming part of Letters Patent No. 296,335, dated April 8, 1884.

Application filed May 8, 1883. (No model.)

*To all whom it may concern:*

Be it known that I, ROBERT KLOSS, a citizen of the United States, residing at Shabonier, in the county of Fayette and State of Illinois, have invented certain new and useful Improvements in Colters, of which the following is a specification.

The object of my invention is to provide a rolling colter for plows, which shall be simple and cheap in construction, and so arranged that the working parts are completely inclosed, preventing any dirt and weeds from getting onto the bearings; and to this end it consists in the peculiar construction and arrangement of parts, substantially as will be hereinafter more fully set forth.

In order to enable others skilled in the art to which my invention appertains to make and use the same, I will now proceed to describe its construction and operation, referring to the accompanying drawings, in which—

Figure 1 is a side elevation, Fig. 2 a central vertical section, and Figs. 3 and 4 are details, of my invention.

A represents the yoke or frame of the colter, of the usual or any desired form to adapt the device to any plow, to which it is secured by any appropriate coupling. The colter B is made of steel in the usual manner, and is formed with an angular central opening having flanges $a\ a$, in which is fitted and firmly held the hub $b$, of wood or any desired material. The ends of this hub project some distance beyond the flanges $a\ a$, and their ends are socketed in the disks C C′ upon either side of the blade of the colter. Each of these disks C C′ has a small projection, $c$, upon the outer side, engaging with the arms of the yoke A, and preventing the disks and yoke turning independently of each other. A bolt, D, passes through the yoke, disks, and hub, being preferably formed with its rear end enlarged, and provided with a screw-thread upon each end adapted to engage with the disks and yoke, while the center of this bolt is formed plain to act as an axle upon which the colter B revolves. A lock-nut, $d$, is placed upon the outer end of the bolt to prevent its accidental displacement.

Between the disks C C′ and the colter upon each side is placed a circular metal plate, E, formed with a peripheral flange, $e$, and a central opening, $e′$, adapted to fit the angular shape of the hub or its supporting-flanges upon the colter.

Within the cup formed by the flanged plate E is placed a washer, F, of leather, soft metal, or other suitable material, upon which the outer lips of the disks C C′ bear and form a dust-tight bearing.

It will readily be understood that the metal pan or flanged plate E and its washer F turn with the colter, and the only frictional surface on the bearing is at the lips upon the edges of the disks, and such as the axle-bolt may have through the revolution of the colter-blade B.

Having thus fully described my invention, what I claim as new, and desire to secure by Letters Patent, is—

In a plow-colter, the combination of the blade B, provided with flanges $a\ a$, the plate E, provided with peripheral flange $e$ and central opening, $e′$, the washer F, the disks C C′, provided on their outer sides with projections $c\ c$, the hub $b$, bolt D, having its center plain and ends screw-threaded, the lock-nut $d$, and yoke A, substantially as described and shown.

In testimony whereof I affix my signature in presence of two witnesses.

ROBERT KLOSS.

Witnesses:
JOHN MILUM,
JOSEPH WALKER.